United States Patent
Li et al.

(10) Patent No.: US 10,396,962 B2
(45) Date of Patent: Aug. 27, 2019

(54) SYSTEM AND METHOD FOR SELF-CONTAINED SUBSLOT BUNDLING

(71) Applicant: QUALCOMM Incorporated, San Diego, CA (US)

(72) Inventors: Chong Li, Weehawken, NJ (US); Junyi Li, Chester, NJ (US); Hao Xu, Beijing (CN); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 15/703,867

(22) Filed: Sep. 13, 2017

(65) Prior Publication Data

US 2018/0175989 A1   Jun. 21, 2018

Related U.S. Application Data

(60) Provisional application No. 62/435,028, filed on Dec. 15, 2016.

(51) Int. Cl.
| | |
|---|---|
| *H04W 72/04* | (2009.01) |
| *H04L 5/00* | (2006.01) |
| *H04B 7/06* | (2006.01) |
| *H04L 1/18* | (2006.01) |

(52) U.S. Cl.
CPC ......... *H04L 5/0055* (2013.01); *H04B 7/0636* (2013.01); *H04L 1/1854* (2013.01); *H04L 5/0007* (2013.01); *H04W 72/0446* (2013.01); *H04L 5/0094* (2013.01)

(58) Field of Classification Search
None
See application file for complete search history.

(56) References Cited

U.S. PATENT DOCUMENTS

| | | | | |
|---|---|---|---|---|
| 2010/0278123 | A1* | 11/2010 | Fong ............ | H04B 7/2656 370/329 |
| 2017/0164213 | A1* | 6/2017 | Lim ............. | H04W 24/02 |
| 2017/0359807 | A1* | 12/2017 | Hong ........... | H04W 52/325 |
| 2018/0070341 | A1* | 3/2018 | Islam .......... | H04L 5/0064 |
| 2018/0091282 | A1* | 3/2018 | Lim ............. | H04W 72/1289 |

(Continued)

OTHER PUBLICATIONS

ZTE, ZTE Microelectronics, "Frame structure design for NR", R1-164274, 3GPP TSG RAN WG1 Meeting #85, Nanjing, China, May 23-27, 2016 (Year: 2016).*

(Continued)

*Primary Examiner* — Kodzovi Acolatse
(74) *Attorney, Agent, or Firm* — Arent Fox LLP

(57) ABSTRACT

An apparatus may configure x subframes with a subslot configuration that includes y subslots, y being greater than x. In an aspect, each subslot of the y subslots may include a first portion having one or more symbols for carrying at least one of data or control information, a second portion having a gap, and a third portion for carrying ACK/NACK information associated with the first portion. In an aspect, the second portion may be between the first portion and the third portion. In an aspect, the second portion and the third portion may include at most one symbol. The apparatus may send information indicating the subslot configuration to at least one neighboring base station. The apparatus may communicate content with a user equipment (UE) during at least one of the y subslots.

20 Claims, 12 Drawing Sheets

(56) References Cited

U.S. PATENT DOCUMENTS

| | | | |
|---|---|---|---|
| 2018/0092089 A1* | 3/2018 | Yin | H04W 72/0446 |
| 2018/0124687 A1* | 5/2018 | Park | H04L 5/1469 |
| 2018/0167164 A1* | 6/2018 | Lin | H04L 1/00 |

OTHER PUBLICATIONS

ETRI: "Design Considerations for UL Control Channel", 3GPP Draft; R1-1612221 UL Control, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016 (Nov. 13, 2016), Retrieved from the Internet: URL:http://www.3gpp.org/ftp/Meetings_3GPP_SYNC/RAN1/Docs/ [retrieved on Nov. 13, 2016], 3 pages.

International Search Report and Written Opinion—PCT/US2017/064032—ISA/EPO—dated Mar. 7, 2018.

ZTE et al., "Multiplexing of eMBB and URLLC", 3GPP Draft; R1-166408, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 21, 2016, XP051140214, Retrieved from the Internet: URL:http://www.3gpp.org/ftp/Meetings_3GPP_SYNC/RAN1/Docs [retrieved on Aug. 21, 2016], 10 pages.

* cited by examiner

SYSTEM AND METHOD FOR SELF-CONTAINED SUBSLOT BUNDLING

CROSS-REFERENCE TO RELATED APPLICATION(S)

This application claims the benefit of U.S. Provisional Application Ser. No. 62/435,028, entitled "SELF-CONTAINED SUBSLOT BUNDLING" and filed on Dec. 15, 2016, which is expressly incorporated by reference herein in its entirety.

BACKGROUND

Technical Field

The present disclosure relates generally to communication systems, and more particularly, to a base station that may configure one or more subframes with a configuration that includes two or more subslots.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may configure x subframes with a subslot configuration that includes y subslots, y being greater than x. In an aspect, each subslot of the y subslots may include a first portion having one or more symbols for carrying at least one of data or control information, a second portion having a gap, and a third portion for carrying acknowledgment (ACK)/negative acknowledgment (NACK) information associated with the first portion. In an aspect, the second portion may be between the first portion and the third portion. In an aspect, the second portion and the third portion may include at most one symbol. The apparatus may send information indicating the subslot configuration to at least one neighboring base station. The apparatus may communicate content with a user equipment during at least one of they subslots. In an aspect, a number of symbols in the first portion may be configurable based at least in part on the content to be communicated. In an aspect, the first portion of a first subslot of they subslots includes a different number of the one or more symbols than the first portion of a second subslot of they subslots. In an aspect, a subslot of they subslots may cross a subframe boundary. In an aspect, the apparatus may puncture data or control information associated with enhanced mobile broadband (eMBB) with the content, and the content may be associated with ultra-reliable low-latency communication (URLLC). In an aspect, the apparatus may cause at least one other base station to reduce transmission power during the y subslots, wherein the at least one other base station is at least a two-hop neighbor of the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
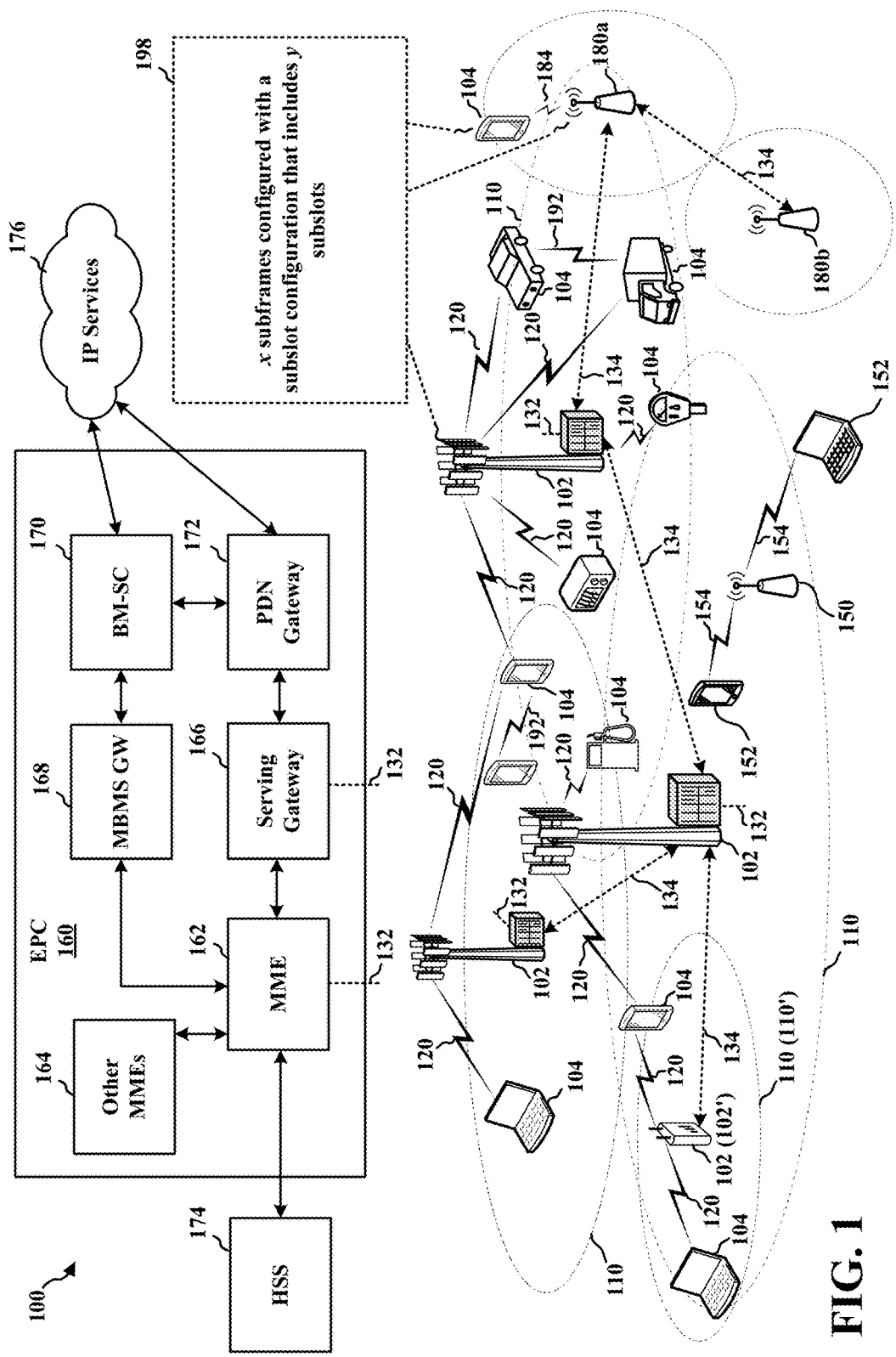
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102 may configure one or more subframes with a subslot configuration 198 that includes one or more subslots. In other words, the base station 102 may configure x subframes with a subslot configuration that includes y subslots. In an aspect, y may be greater than x. Each of the y subslots may include three portions: a first portion having one or more symbols for carrying at least one of data or control information, a second portion having a gap, and a third portion for carrying acknowledgement (ACK)/negative acknowledgement (NACK) information associated with the first portion. In an aspect, the second portion may be between the first portion and the third portion. In an aspect, the second portion and the third portion may be at most one symbol.

The base station 102 may be configured to communicate content (e.g., data or control information) with a UE 104 during the y subslots of the subslot configuration 198. The base station 102 may communicate at least two types of content, a first of which may be associated with enhanced mobile broadband (eMBB) and a second of which may be associated with ultra-reliable low-latency communication (URLLC). In an aspect, the base station 102 may puncture data or control information associated with eMBB with content that is associated with URLLC and may communicate the content associated with URLLC with the UE 104.

In an aspect, the base station 102 may configure a number of symbols in the first portion of one or more subslots based at least in part on the URLLC content that is to be communicated with the UE 104. In an aspect, the base station 102 may configure a number of symbols in a first portion of a first subslot to be different from a number of symbols in a first portion of a second subslot. That is, the subslot configuration 198 may include a plurality of subslots, but those plurality of subslots do not necessarily include the same number of symbols during a respective first portion. In an aspect, the base station 102 may configure the subslot configuration 198 such that at least one subslot of the y subslots crosses a subframe boundary.

In order to improve communication of URLLC content (e.g., interference mitigation), the base station 102 may send information indicating the subslot configuration 198 to a first neighboring base station 180a. The first neighboring base station 180a may be a one-hop neighbor or first-ring neighbor with respect to the base station 102. The base station 102 may send the information indicating the subslot configuration 198 to the first neighboring base station 180a using a backhaul link 134.

Further, the base station 102 may improve communication of URLLC content (e.g., interference mitigation) by causing a second neighboring base station 180*b* to reduce transmission power during the y subslots. In an aspect, the second neighboring base station 180*b* may be at least a two-hop neighbor with respect to the base station 102. In an aspect, the first neighboring base station 180*a* may send information indicating that the second neighboring base station 180*b* is to reduce transmission power at least during the y subslots, for example, based on the subslot configuration 198 received from the base station 102. For example, the first neighboring base station 180*a* may send, using the backhaul link 134, an indication that the second neighboring base station 180*b* is to perform power fallback at least during one or more subframes configured with one or more subslots.

Figures 2A, 2B, 2C, 2D:
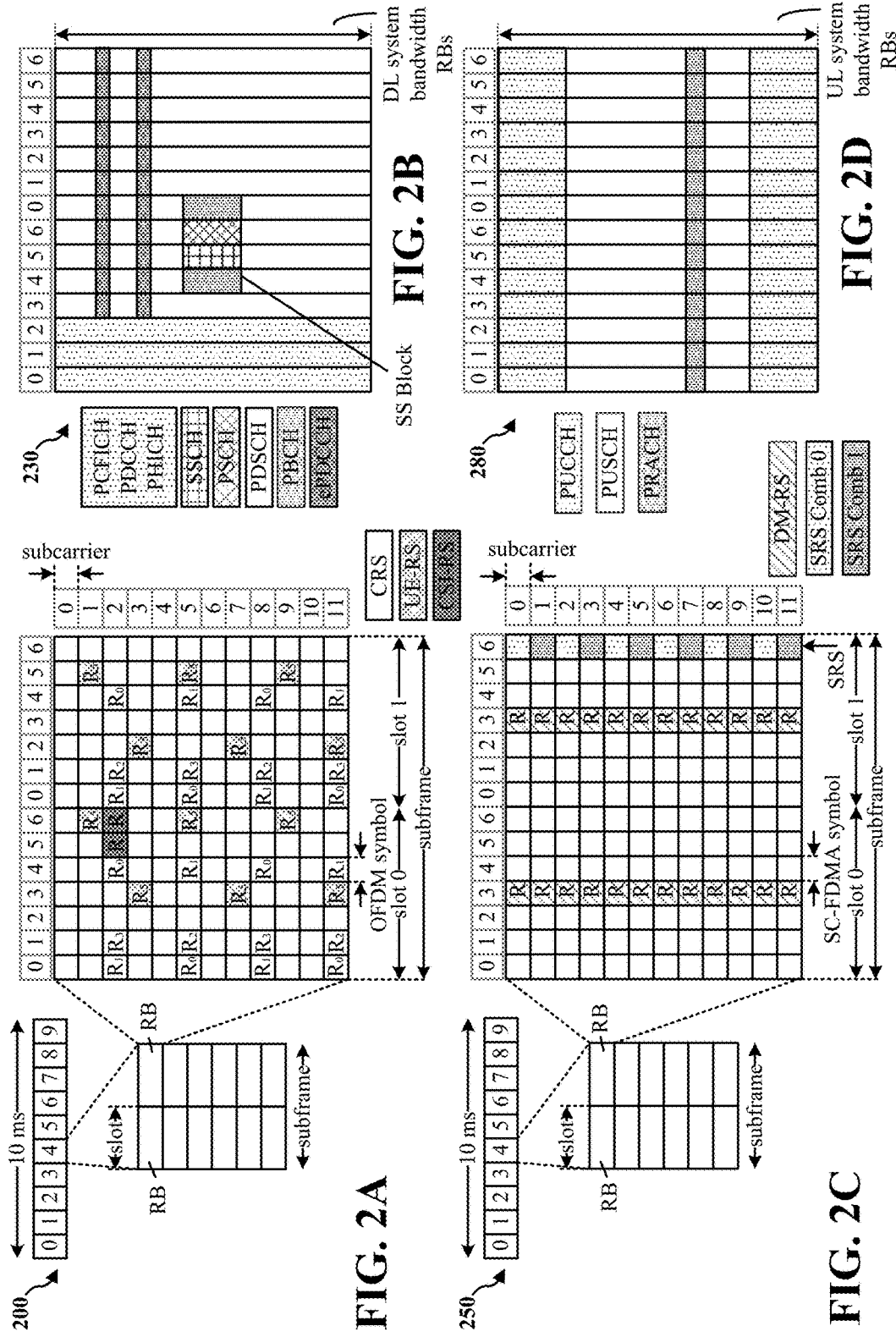
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
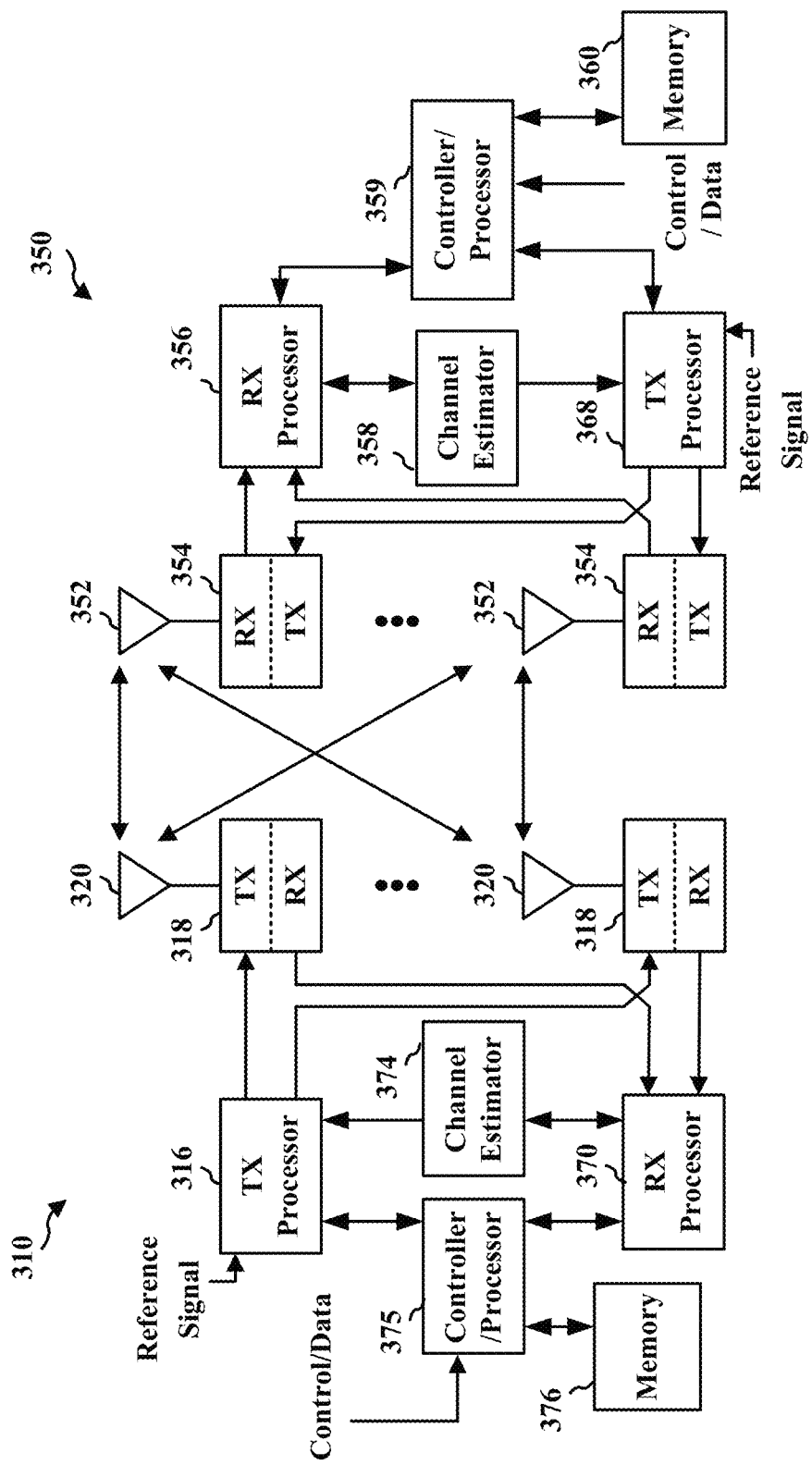
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
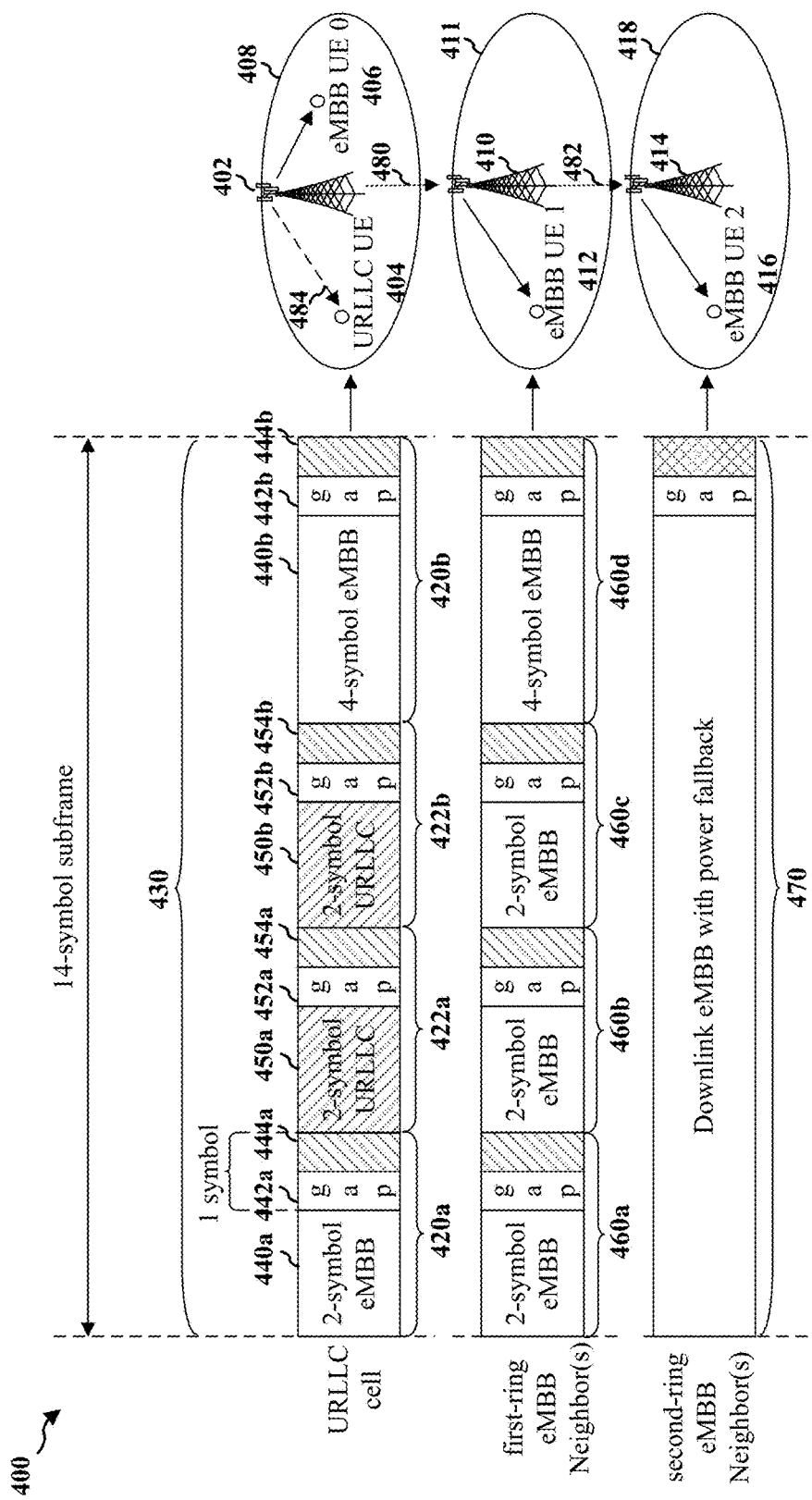
FIG. 4 is a diagram of an example wireless communications system.

FIG. 4 is a diagram of a wireless communications system 400. The wireless communications system 400 may include a plurality of base stations 402, 410, 414, each configured to provide a respective cell 408, 411, 418. Each of the base stations 402, 410, 414 may be configured to communicate with one or more UEs 404, 406, 412, 416 operating on the respective cells 408, 411, 418.

In one aspect, the first base station 402 may be configured to communicate according to eMBB as well as URLLC. In the illustrated aspect, the first base station 402 may communicate with a first UE 404 according to URLLC and, additionally, may communicate with a second UE 406 according to eMBB. The neighboring base stations 410, 414 may be configured to communicate according to at least eMBB. According to one or more 3GPP technical specifications, both URLLC and eMBB may be regarded as 5G technologies.

In an aspect, the base stations 402, 410, 414 may be configured to use a NR frame structure at least within a cyclic prefix (CP) overhead. The description of NR frame structure is to be regarded as illustrative, and the present disclosure comprehends other structures or arrangements in addition to those described herein.

In one aspect, the reference numerology for a subframe definition may be fourteen (14). For example, the base stations 402, 410, 414 may be configured to communicate during a subframe that includes fourteen symbols.

In an aspect, the NR frame structure may include slots of a duration that is less than the reference numerology for a subframe (e.g., a number of symbols per slot may be fewer than a number of symbols per subframe). In an aspect, an integer number of slots may fit within one subframe duration (e.g., at least for subcarrier spacing that is larger than or equal to the reference numerology). In an aspect, this slot structure may allow for control information at the beginning, end, or both the beginning and end of a slot. The slot configuration may be one possible scheduling unit implemented by the one or more base stations 402, 410, 414.

In an aspect, the NR frame structure may include a subslot configuration, which may also be known as a "mini-slot" or another naming convention related to a transmission time interval (TTI). The subslot configuration may support transmission time that is shorter than the reference numerology (and, possibly, the slot numerology). For example, the reference numerology for a subframe may be fourteen, and the numerology for a subslot may be less than fourteen (and may be less than the slot numerology, as well). In one aspect, a subslot may be the smallest scheduling unit implemented by one or more base stations 402, 410, 414. In one aspect, the subslot configuration may indicate that control information may occur at the beginning of a subslot, the end of a subslot, or both the beginning and the end of a subslot. In one aspect, the slot structure and subslot structure may be merged or, alternatively, the slot configuration may be absent.

As indicated, the first base station 402 may communicate URLLC content. In one aspect, URLLC content may be predictable (e.g., periodic), in which case at least one semi-static resource may be reserved for frequency-division multiplexing (FDM) or time-division multiplexing (TDM) of URLLC content with eMBB information. In one aspect, URLLC content may be less predictable (e.g., sporadic), in which case the first base station 402 may be configured to puncture eMBB information with URLLC content. URLLC may require packet delivery to occur with stringent latency constraints and/or relatively low packet error rate. Therefore, interference due to coexistence with other systems may have detrimental consequences to the performance of URLLC. URLLC content may be prioritized over eMBB information and, therefore, the first base station 402 may perform one or more operations in order to mitigate inter-cell interference and improve quality of URLLC communication.

According to aspects, the first base station 402 may configure x subframes (including a first subframe 430) with a subslot configuration that includes y subslots (including a set of subslots 420a, 420b, 422a, 422b). In an aspect, y may be greater than x—i.e., the number of subslots may be greater than the number of subframes and, consequently, the duration (e.g., number of symbols) of each subframe may be greater than the duration (e.g., number of symbols) of each subslot.

In the illustrated aspect, a subframe may include fourteen symbols (e.g., the reference numerology); however, the present disclosure contemplates subframe configurations having a different number of the one or more symbols. The first base station 402 may configure a first subframe 430 with a subslot configuration that includes a plurality of subslots 420a, 420b, 422a, 422b. For example, the first base station 402 may configure the first subframe 430 to include two subslots 420a, 420b associated with eMBB. The subslots 420a, 420b associated with eMBB may carry data or control information associated with eMBB, which may be communicated with the second UE 406. Additionally, the first base station 402 may configure the first subframe 430 to include two subslots 422a, 422b associated with URLLC. The subslots 422a, 422b associated with URLLC may carry data or control information associated with URLLC, which may be communicated with the first UE 404.

Each of they subslots may include three portions: a first portion having one or more symbols for carrying at least one of data or control information, a second portion having a gap, and a third portion for carrying ACK/NACK information associated with the first portion. In an aspect, the second portion may be between the first portion and the third portion. In an aspect, the second portion and the third portion may be at most one symbol.

In the illustrated aspect, the first base station 402 may configure a first eMBB subslot 420a to include first portion 440a that is two symbols, but may configure a second eMBB subslot 420b to include a first portion 440b that is four symbols. Each of the eMBB subslots 420a, 420b may include a respective second portion 442a, 442b having a gap and a respective third portion 444a, 444b for carrying ACK/NACK information.

Similarly, the first base station 402 may configure a first URLLC subslot 422a to include first portion 450a that is two symbols and may configure a second URLLC subslot 422b to include a first portion 450b that is also two symbols. Each of the URLLC subslots 422a, 422b may include a respective second portion 452a, 452b having a gap and a respective third portion 454a, 454b for carrying ACK/NACK information.

According to this configuration, each subslot 420a, 420b, 422a, 422b may be regarded as "self-contained" because each subslot 420a, 420b, 422a, 422b includes both a respective first portion 440a, 440b, 450a, 450b for carrying data or control information and a respective third portion 444a, 444b, 454a, 454b for carrying ACK/NACK information associated with the respective first portion 440a, 440b, 450a, 450b.

While the present disclosure illustrates a specific number of symbols for the set of subslots 420a, 420b, 422a, 422b, other configurations are possible without departing from the present disclosure. For example, the URLLC subslots 422a, 422b may include greater or fewer than two symbols and/or may include a different number of the one or more symbols with respect to other URLLC subslots. Furthermore, the first base station 402 may configure a subslot to cross a subframe boundary.

The first base station 402 may be configured to communicate content 484 (e.g., data or control information) with the first UE 404 during the URLLC subslots 422a, 422b. In an aspect, the first base station 402 may puncture data or control information associated with eMBB with content 484 that is associated with URLLC and may communicate the content 484 associated with URLLC with the first UE 404. According to one aspect, the first base station 402 may configure the number of symbols of each first portion 450a, 450b of each URLLC subslot 422a, 422b based at least in part on the content 484 to be communicated. For example, the first base station 402 may determine URLLC content to be communicated to the first UE 404 (e.g., based on arrival of one or more URLLC packets from a higher layer) and may determine a number of symbols that are to carry the content. The first base station 402 may configure the first subframe 430 to include the two URLLC subslots 422a, 422b having respective two-symbol first portions 450a, 450b based on the content 484 to be communicated to the first UE 404.

In various aspects, the first base station 402 may reconfigure the subslot configuration following the subframe 430. For example, the first base station 402 may determine that a different number of symbols are to be used to communicate content during a subsequent subframe, for example, because URLLC traffic may be sporadic and/or unpredictable. Consequently, the subslot configuration may not be static, and the first base station 402 may reconfigure the subslot configuration at any time.

In order to improve communication of URLLC content (e.g., interference mitigation), the first base station 402 may send information 480 indicating the subslot configuration to a first neighboring base station 410. The information 480 indicating the subslot configuration may include, for example, a number of subslots, an indication of a number of symbols for a respective first portion of each subslot, or essentially any other information from which the first neighboring base station 410 may derive the subslot configuration implemented by the first base station 402.

Based on the information 480 indicating the subslot configuration, the first neighboring base station 410 may configure x subframes into y subslots. Accordingly, the subslots 460a, 460b, 460c, 460d during which the first neighboring base station 410 communicates may be synchronized with the subslots 420a, 420b, 422a, 422b during which the first base station 402 communicates. That is, the first neighboring base station 410 may configure boundaries of subslots 460a, 460b, 460c, 460d to be synchronized with the boundaries of the subslots 420a, 420b, 422a, 422b configured by the first base station 402. However, the type of data carried in a first portion of the subslots 460a, 460b, 460c, 460d of the first neighboring base station 410 may not be synchronized. For example, the first neighboring base station 410 may communicate according to eMBB and not URLLC and, therefore, the first neighboring base station 410 may not include URLLC subslots, such as the URLLC subslots 422a, 422b configured by the first base station 402.

The first neighboring base station 410 may be a one-hop neighbor or first-ring neighbor with respect to the first base station 402. In one aspect, a one-hop neighbor or first-ring neighbor may be a base station with which the first base station 402 may communicate without traversing any intervening nodes (e.g., another base station). The first base station 402 may send the information 480 indicating the subslot configuration to the first neighboring base station 410 using a backhaul link (e.g., via the X2 interface). Because the subslot configuration may be reconfigured (e.g., by the first base station 402), the first base station 402 and the first neighboring base station 410 may maintain synchronization of subslots. For example, the first base station 402 may send information 480 indicating a subslot configuration each time the first base station 402 reconfigures the subslot configuration.

In various aspects, the first base station 402 may improve communication of URLLC content (e.g., interference mitigation) by causing a second neighboring base station 414 to reduce transmission power during the y subslots. In an aspect, the second neighboring base station 414 may be at least a two-hop neighbor with respect to the first base station 402. In one aspect, a two-hop neighbor or second-ring neighbor may be a base station with which the first base station 402 may communicate by traversing at least one intervening node (e.g., the first neighboring base station 410). Because the second neighboring base station 414 is a two-hop neighbor, the first neighboring base station 410 may send the information 482 indicating that the second neighboring base station 414 is to perform power fallback during the subframe 470 that overlaps with URLLC subslots 422a, 422b. The first neighboring base station 410 may send the information 482 over a wireless and/or wired connection, including over the air interface or over a backhaul link.

In an aspect, the first neighboring base station 410 may send information 482 indicating that the second neighboring base station 414 is to reduce transmission power at least during at least one of the y subslots, for example, based on the information 480 indicating the subslot configuration received from the first base station 402. For example, when the first base station 402 sends the information 480 indicating the subslot configuration to the first neighboring base station 410, the first base station 402 may indicate to the second neighboring base station 414 that the second neighboring base station 414 to perform power fallback during a subframe 470 that overlaps with URLLC subslots 422a, 422b. In an aspect, power fallback may be performed for a portion of the subframe 470, such as the portion that overlaps with the URLLC subslots 422a, 422b.

Based on the information 482 indicating that the second neighboring base station 414 is to perform the power fallback, the second neighboring base station 414 may reduce transmission power during the subframe 470. This power fallback by the second neighboring base station 414 may avoid a ripple effect in which base stations configure subframes with a subslot configuration that may not be necessary. Additionally, the power fallback may protect an uplink common burst (UCB) channel used in the first neighboring cell 411 (e.g., the UCB channel may carry ACK/NACK information associated with the subslots 460a, 460b, 460c, 460d). In an aspect, the second neighboring base station 414 may perform power fallback during a portion of the subframe 470 (rather than during the entire subframe 470).

The second neighboring base station 414 may, in a subsequent subframe, increase transmission power (e.g., return to a transmission power utilized prior to reception of the information 482 indicating that the second neighboring base station 414 is to perform the power fallback). However, because the subslot configuration may be reconfigured (e.g., by the first base station 402), the first base station 402 may cause the second neighboring base station 414 to reduce transmission power in one or more additional subframes, for example, when the first base station 402 sends information 480 indicating a subslot reconfiguration.

Figure 5:
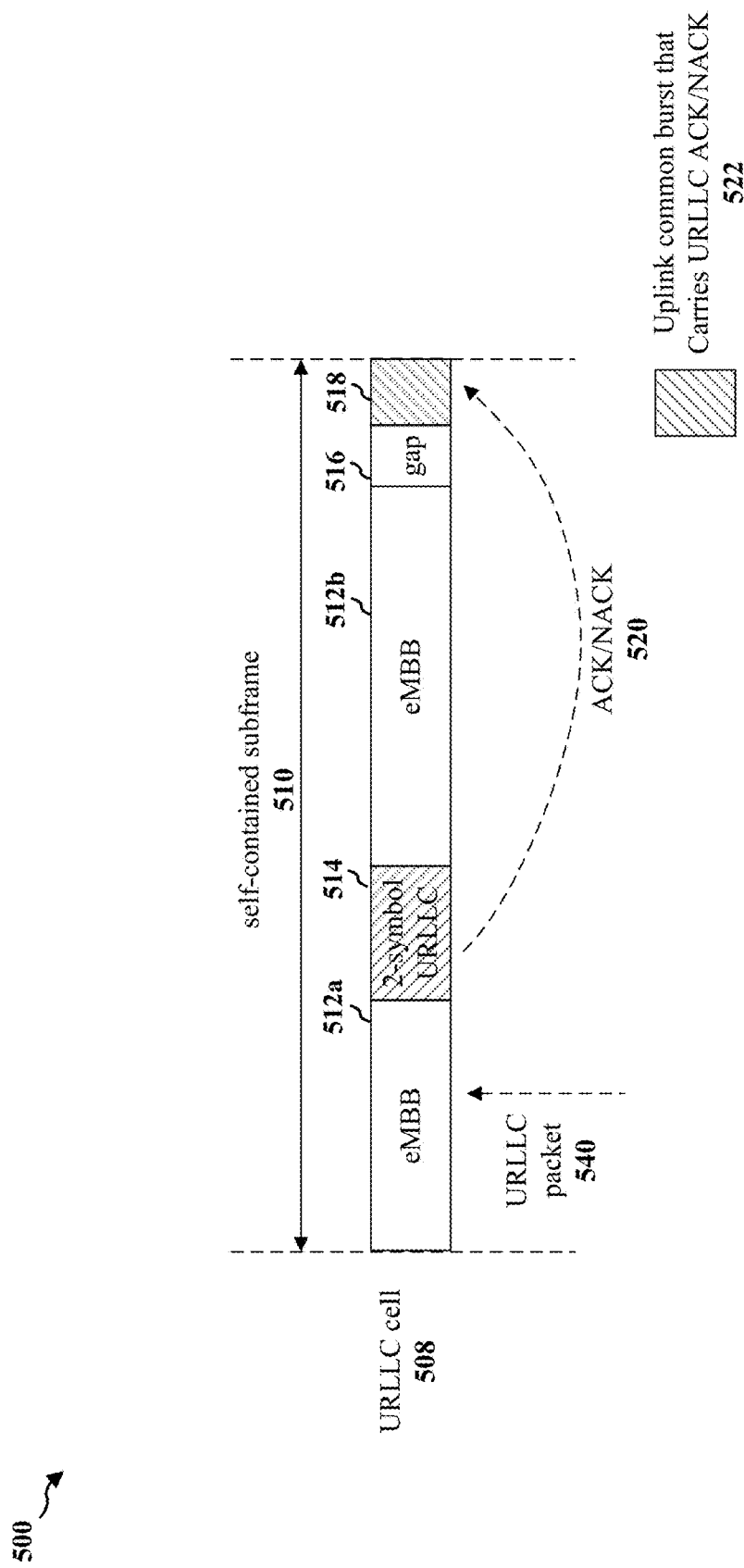
FIG. 5 is a diagram of an example subframe structure.

FIG. 5 illustrates a subframe structure 500, according to an aspect. The subframe structure 500 may include a self-contained subframe 510. That is, the self-contained subframe 510 may include a portion 518 for carrying ACK/NACK information. In an aspect, the ACK/NACK information may be carried on an UCB channel.

In aspects, a base station may communicate content in a URLLC cell 508 during the self-contained subframe 510. When a URLLC packet 540 arrives (e.g., from a higher layer), the base station may puncture data or control information associated with eMBB with URLLC content derived from the URLLC packet 540. For example, the URLLC content from the URLLC packet 540 may be carried in two symbols of a URLLC portion 514 of the self-contained subframe 510. The corresponding ACK/NACK information 520 for the URLLC content carried in the URLLC portion 514 may occur during the ACK/NACK portion 518 at the end of the self-contained subframe 510.

Because URLLC may adhere to low-latency and/or low-error rate requirements, the URLLC content may be punctured into the self-contained subframe 510 as soon as the URLLC packet 540 arrives. Consequently, an eMBB portion 512*b* may occur between the URLLC portion 514 and the ACK/NACK portion 518. This intervening eMBB portion 512*b* may lead to an unsatisfactory delay in communicating ACK/NACK information 520, for example, because a base station would be unaware of the reception status of the URLLC content (communicated in the middle of the self-contained subframe 510) until the end of the self-contained subframe 510. Accordingly, a URLLC cell may benefit from a self-contained subslot configuration.

Figure 6:
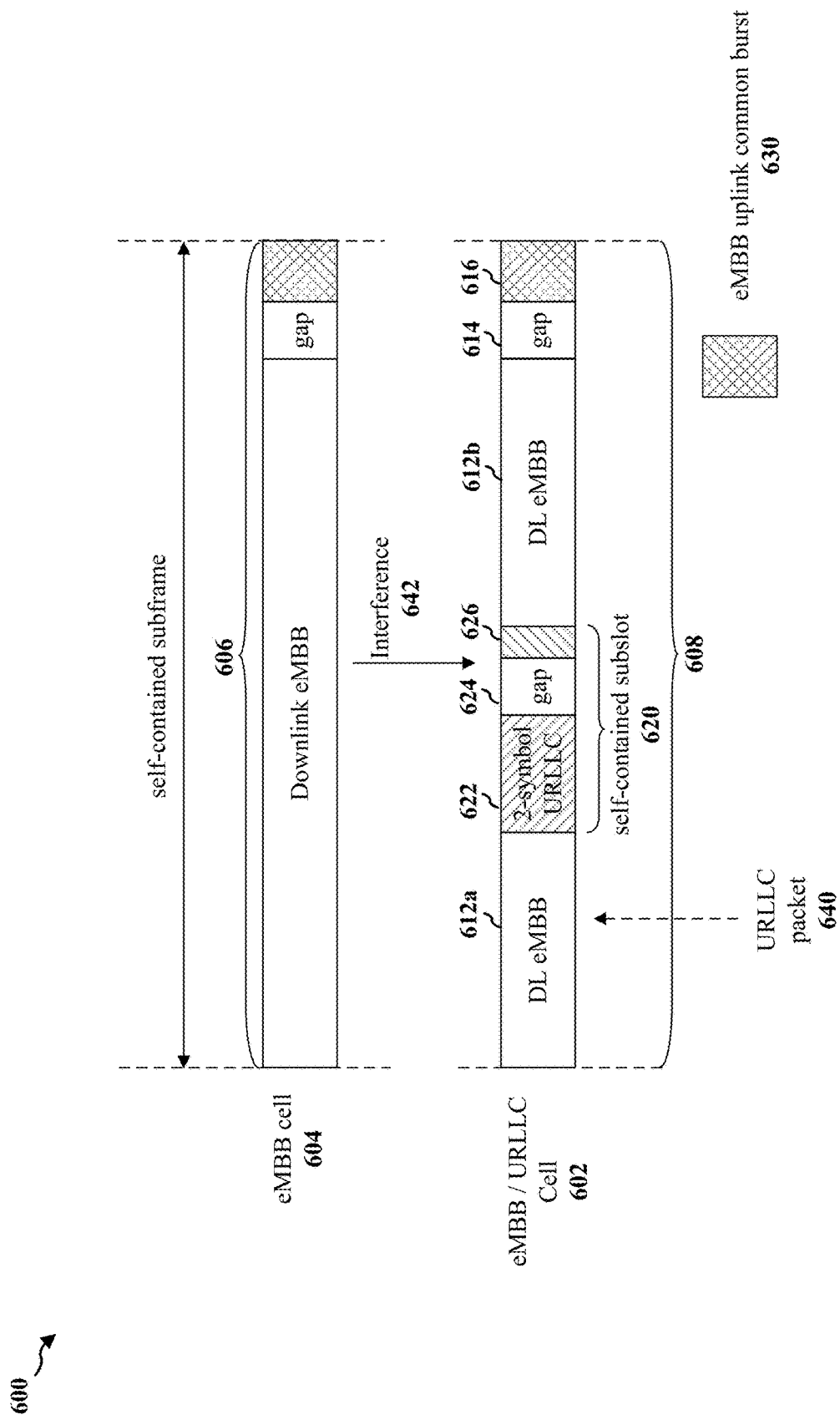
FIG. 6 is a diagram of an example subslot configuration.

FIG. 6 illustrates a subslot configuration 600, according to an aspect. In an aspect, an eMBB/URLLC cell 602 (e.g., the first cell 408 provided by the first base station 402) may configure x subframes (including the subframe 608) with a subslot configuration that includes y subslots (including the self-contained subslot 620). At least one subslot may be a self-contained subslot (e.g., the self-contained subslot 620). The subslot 620 may be regarded as "self-contained" because the subslot 620 includes at least a first portion 622 for carrying data or control information and a third portion 626 for carrying ACK/NACK information associated with the first portion 622 (n.b., the subslot 620 may include a second portion 624 that is a gap between the first and third portions). That is, the self-contained subslot 620 may include a portion 626 for carrying ACK/NACK information.

The subframe 608 configured with the self-contained subslot 620 may include a separate portion 616 for carrying ACK/NACK information (e.g., associated with eMBB data or control information carried in another portion 612 of the subframe). In an aspect, the ACK/NACK information may be carried on a UCB channel.

In aspects, a base station may communicate content in a EMBB/URLLC cell 602 during the subframe 608. When a URLLC packet 640 arrives (e.g., from a higher layer), the base station may puncture data or control information associated with eMBB with URLLC content derived from the URLLC packet 640. For example, the URLLC content from the URLLC packet 640 may be carried in two symbols of a self-contained subslot 620. Because URLLC may adhere to low-latency and low-error rate requirements, the URLLC content may be punctured into the self-contained subslot 620 as soon as the URLLC packet 640 arrives.

In an eMBB cell 604, which may neighbor the eMBB/URLLC cell 602, data or control information associated with eMBB may be communicated during a subframe 606 that overlaps with the self-contained subslot 620. This eMBB traffic during the eMBB subframe 606 may cause interference 642 to the self-contained subslot 620. For example, the interference 642 may prevent a base station from receiving and/or decoding ACK/NACK information associated with the first portion 622 of the self-contained subslot 620. Accordingly, the URLLC (or URLCC/eMBB) cell may benefit when the subslot configuration of the URLLC cell is synchronized with a neighboring cell. For example, interference 642 may be absent during the third portion 626 if the subframe 606 of the eMBB cell 604 is configured so that eMBB data or control information is not communicated during a portion of the subframe 606 that overlaps with the third portion 626 of the self-contained subslot 620.

Figure 7:
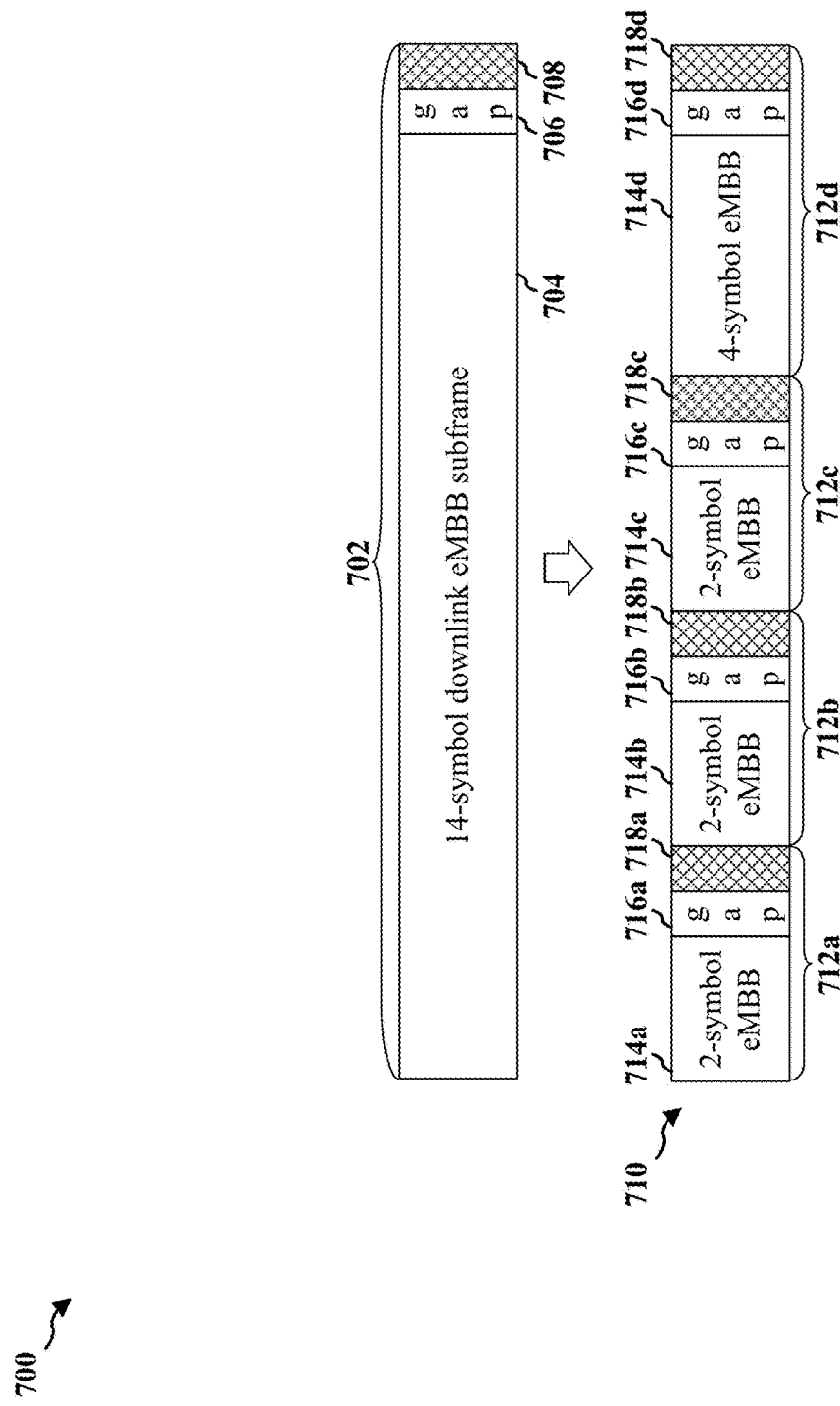
FIG. 7 is a diagram of an example subslot configuration.

FIG. 7 illustrates a subslot configuration 700, according to various aspects. In various aspects, a subframe 702 may be configured in cell (e.g., the first cell 408, the EMBB/URLLC cell 602) based on a reference numerology, such as fourteen. The subframe 702 may include a portion 704 that is to carry data and/or control information, a gap 706, and a portion 708 that is to carry ACK/NACK information (e.g., on a UCB channel). According to aspects, the subframe 702 may be configured in order to carry data associated with eMBB.

In various aspects, a base station (e.g., the first base station 402) may configure the subframe 702 into the plurality of subslots 712*a*, 712*b*, 712*c*, 712*d*. Each subslot 712 may be configured to include a first portion 714 having one or more symbols for carrying at least one of data or control information. Each subslot 712 may include a second portion 716 having a gap. Each subslot 712 may include a third portion 718 for carrying ACK/NACK information associated with the first portion 714. The second portion 716 may occur between the first portion 714 and the third portion 718. In an aspect, the second portion 716 and the third portion 718 may be at most one symbol.

The base station may puncture one or more of the subslots 712*a*, 712*b*, 712*c*, 712*d* with URLLC data or control information, for example, when a URLLC packet is received (e.g., from a higher layer). In one aspect, the base station may configure a number of symbols for the first portion 714 based at least in part on URLLC content (e.g., data and/or control information) to be communicated. In an aspect, the base station may configure the number of symbols for the first portion before determining the URLLC content (e.g., before a URLLC packet arrives from a higher layer). Accordingly, the base station may be able to puncture eMBB information with URLLC content as soon as the URLLC content is determined.

The base station may send information indicating the subslot configuration 710 to at least one neighboring base station (e.g., the first neighboring base station 410). Based on the information indicating the subslot configuration 710, the neighboring base station may configure at least one subframe to by synchronized with the subslot configuration 710 configured by the base station. Accordingly, the respective first, second, and third portions of subslots in the neighboring cell provided by the neighboring base station may occur contemporaneously with the respective first portions 714*a*, 714*b*, 714*c*, 714*d*, second portions 716*a*, 716*b*, 716*c*, 716*d*, and third portions 718*a*, 718*b*, 718*c*, 718*d* during which the base station communicates. This synchronization may mitigate interference. For example, the ACK/NACK information carried in the third portions 718*a*, 718*b*, 718*c*, 718*d* may not experience interference 642 from downlink transmissions that occur during the subframe 606 in a neighboring eMBB cell 604.

Figure 8:
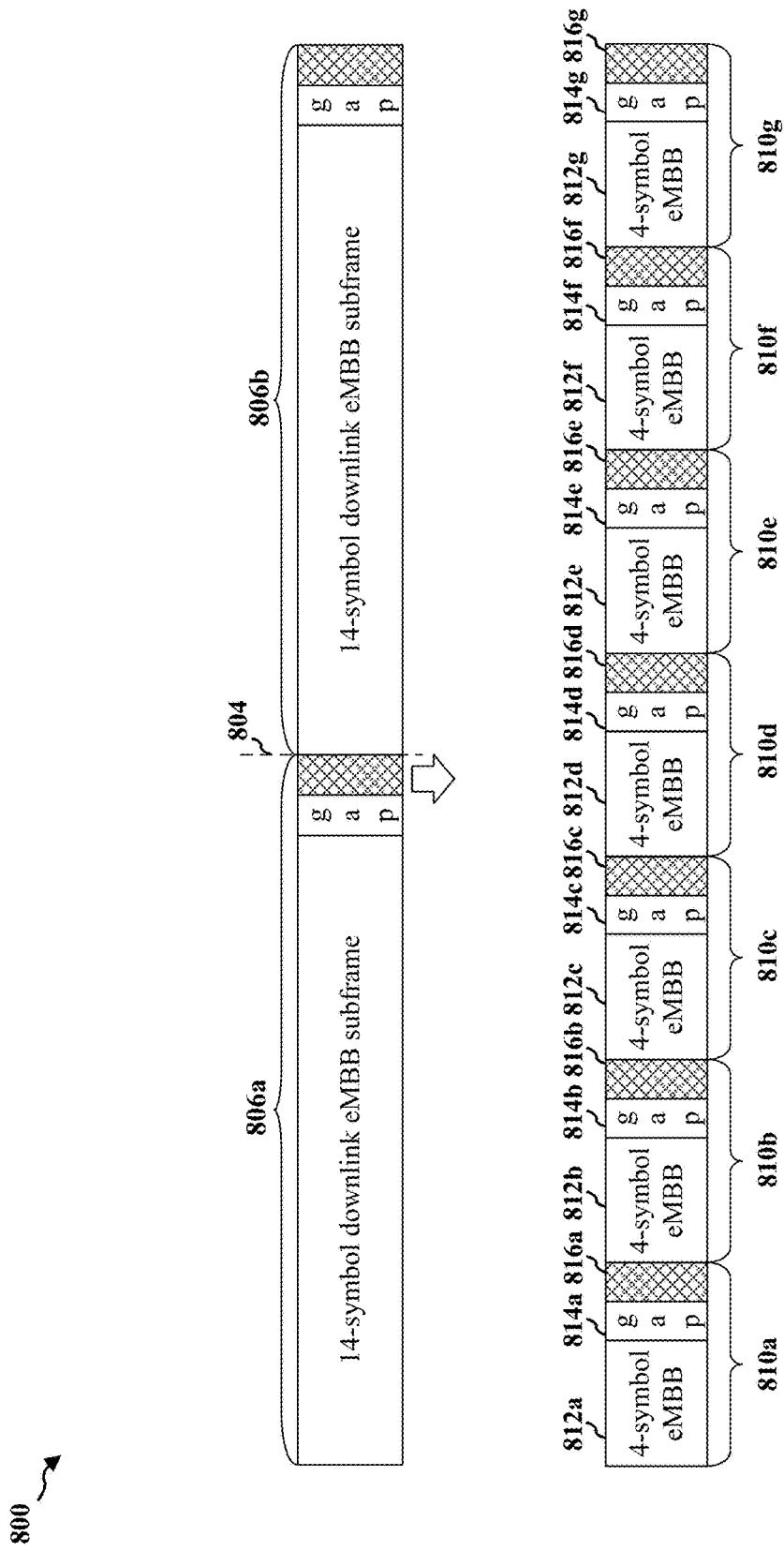
FIG. 8 is a diagram of an example subslot configuration.

FIG. 8 illustrates a subslot configuration 800, according to various aspects. In various aspects, two subframes 806*a*, 806*b* may be configured in cell (e.g., the first cell 408, the eMBB/URLLC cell 602) into a plurality of subslots 810*a*, 810*b*, 810*c*, 810*d*, 810*e*, 810*f*, 810*g*.

In various aspects, a base station (e.g., the first base station 402) may configure the subframes 806*a*, 806*b* into the plurality of subslots 810*a*, 810*b*, 810*c*, 810*d*, 810*e*, 810*f*, 810*g*. Each subslot 810 may be configured to include a first portion 812 having one or more symbols for carrying at least one of data or control information. Each subslot 810 may include a second portion 814 having a gap. Each subslot 810 may include a third portion 816 for carrying ACK/NACK information associated with the first portion 812. The second portion 814 may occur between the first portion 812 and the third portion 816. In an aspect, the second portion 814 and the third portion 816 may be at most one symbol. In various aspects, the base station may configure the subframes 806a, 806b with a subslot configuration that crosses a subframe boundary 804.

While the subslots 810a, 810b, 810c, 810d, 810e, 810f, 810g are illustrated as each including four symbols, the base station may configure the subframes 806a, 806b with a subslot configuration in which a subslot has another number of symbols (e.g., two, three, five, seven, etc.). Additionally, the base station may configure the subframes 806a, 806b with a subslot configuration in which at least two subslots have a different number of symbols from one another—e.g., the first subslot 810a may include four symbols, whereas the second subslot 810b may include two symbols.

Figure 9A:
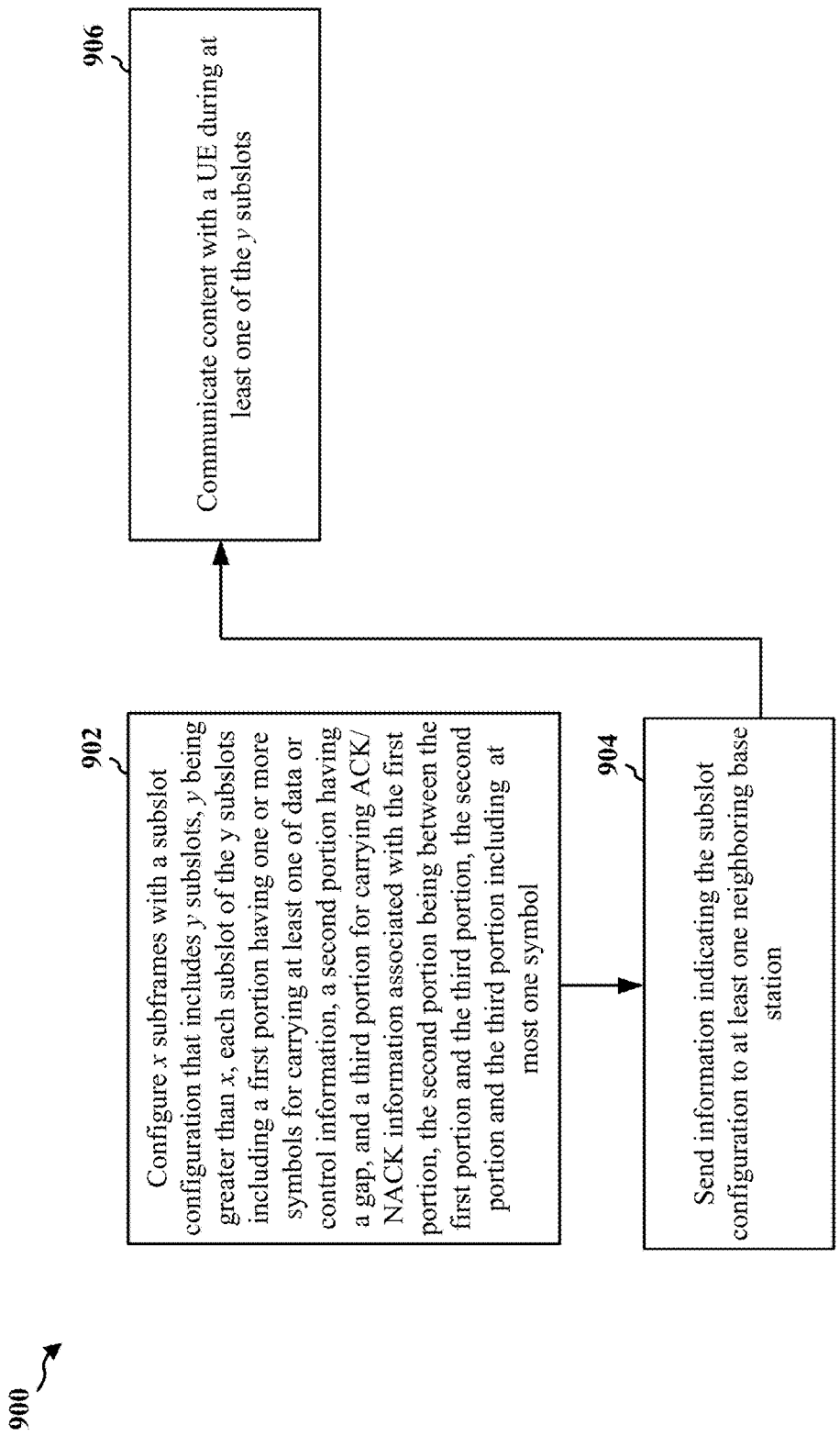
FIG. 9A is a flowchart of an example method of wireless communication.

FIG. 9A is a flowchart of a method 900 of wireless communication. The method may be performed by a base station (e.g., the base station 102, the base station 402, the apparatus 1002/1002'). While the method 900 illustrates a plurality of discrete operations, the present disclosure contemplates aspects in which one or more operations are transposed, omitted, and/or contemporaneously performed.

Beginning at 902, a first base station may configure x subframes with a subslot configuration that includes y subslots. For example, the first base station may schedule at least one subframe, and the first base station may schedule a plurality of subslots during the at least one subframe. In aspects, y may be greater than x. Each subslot of the y subslots may include a first portion having one or more symbols for carrying at least one of data or control information, a second portion having a gap, and a third portion for carrying ACK/NACK information associated with the first portion. The second portion may occur between the first portion and the third portion. In aspects, the second portion and the third portion may include at most one symbol.

In one aspect, the first portion of a first subslot of they subslots may include a different number of the one or more symbols than the first portion of a second subslot of the y subslots. For example, the first subslot may include a first portion having two symbols for carrying at least one of data or control information, whereas the second subslot may include a first portion having four symbols for carrying at least one of data or control information.

In one aspect, the number of symbols in the first portion may be configurable based at least in part on content that is to be communicated to a UE. For example, the first base station may determine a number of symbols required to communicate content (e.g., URLLC content) based on one or more packets (e.g., packet(s) received from a higher layer of the first base station).

In the context of FIG. 4, the first base station 402 may configure the first subframe 430 with a subframe configuration that includes the set of subslots 420a, 420b, 422a, 422b. According to another example, a base station may configure a subframe that includes the self-contained subslot 620. According to another example, a base station may configure a subframe 702 with the subslot configuration 710. According to another example, a base station may configure a plurality of subframes 806a, 806b with a subframe configuration that includes a plurality of subslots 810a, 810b, 810c, 810d, 810e, 810f, 810g, and at least one subslot 810d may cross a subframe boundary 804.

At operation 904, the first base station may send information indicating the subslot configuration to at least a first neighboring base station. Based on the information indicating the subslot configuration, the first neighboring base station may configure x subframes with a subframe configuration that includes y subslots so that the subslot configuration used in a cell provided by the first neighboring base station is synchronized with the subslot configuration used in a cell provided by the first base station. The first neighboring base station may be a one-hop neighbor or first-ring neighbor with respect to the first base station, and this subslot configuration synchronization may mitigate interference, introduced by the first neighboring base station, to content (e.g., URLLC content) communicated by the first base station during one or more subslots of they subslots. In the context of FIG. 4, the first base station 402 may send information 480 indicating the subslot configuration.

At operation 910, the first base station may communicate content with a UE during at least one of they subslots. For example, the first base station may send content (e.g., URLLC content, data or control information, etc.) in at least one subslot of the y subslots. In the context of FIG. 4, the first base station 402 may communicate content 484 (e.g., data or control information) with the first UE 404 during at least one of the URLLC subslots 422a, 422b.

Figure 9B:
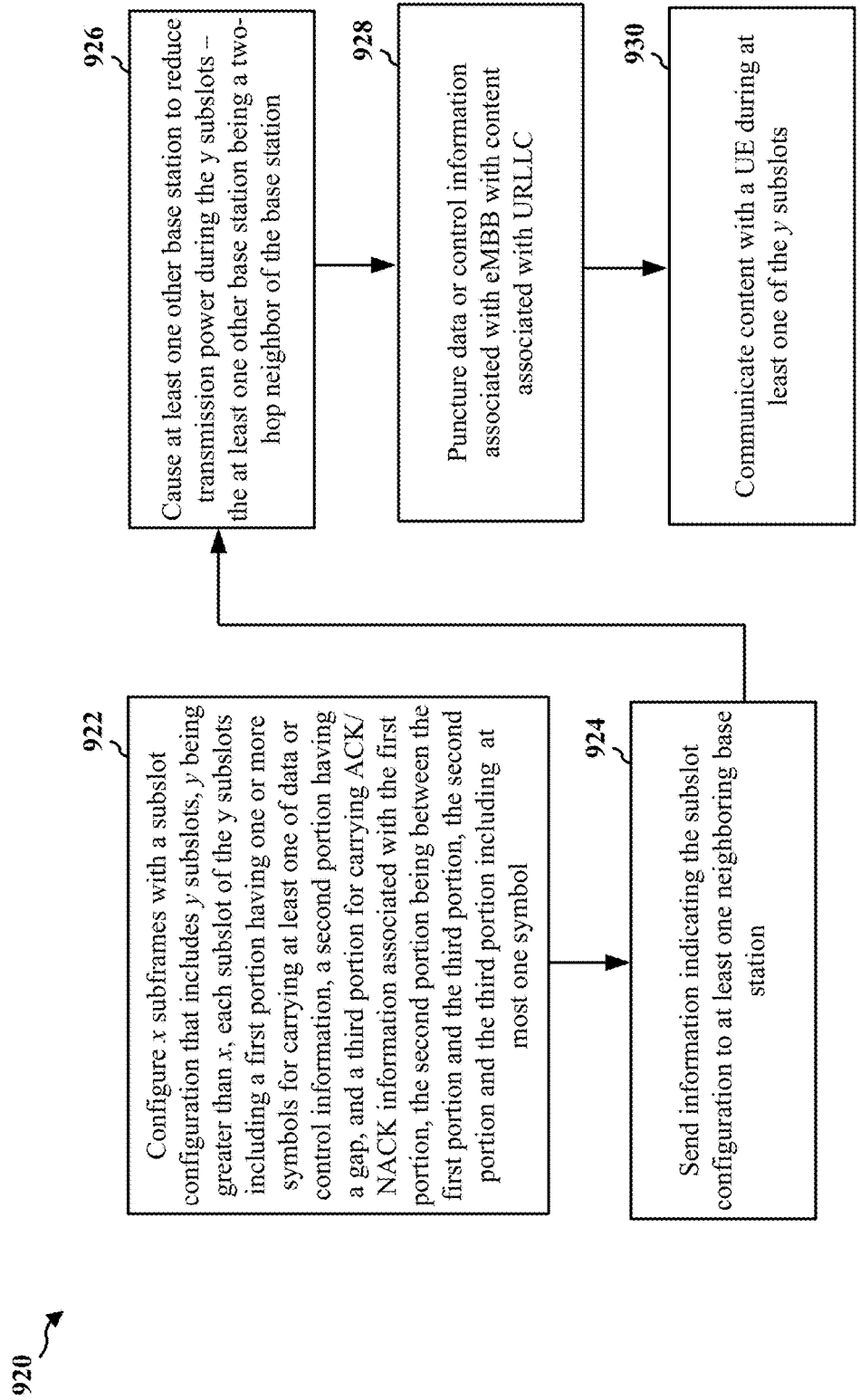
FIG. 9B is a flowchart of an example method of wireless communication.

FIG. 9B is a flowchart of a method 920 of wireless communication. The method may be performed by a base station (e.g., the base station 102, the base station 402, the apparatus 1002/1002'). While the method 900 illustrates a plurality of discrete operations, the present disclosure contemplates aspects in which one or more operations are transposed, omitted, and/or contemporaneously performed.

Beginning at 922, a first base station may configure x subframes with a subslot configuration that includes y subslots. For example, the first base station may schedule at least one subframe, and the first base station may schedule a plurality of subslots during the at least one subframe. In aspects, y may be greater than x. Each subslot of the y subslots may include a first portion having one or more symbols for carrying at least one of data or control information, a second portion having a gap, and a third portion for carrying ACK/NACK information associated with the first portion. The second portion may occur between the first portion and the third portion. In aspects, the second portion and the third portion may include at most one symbol.

In one aspect, the first portion of a first subslot of they subslots may include a different number of the one or more symbols than the first portion of a second subslot of the y subslots. For example, the first subslot may include a first portion having two symbols for carrying at least one of data or control information, whereas the second subslot may include a first portion having four symbols for carrying at least one of data or control information.

In one aspect, the number of symbols in the first portion may be configurable based at least in part on content that is to be communicated to a UE. For example, the first base station may determine a number of symbols required to communicate content (e.g., URLLC content) based on one or more packets (e.g., packet(s) received from a higher layer of the first base station).

In the context of FIG. 4, the first base station 402 may configure the first subframe 430 with a subframe configuration that includes the set of subslots 420a, 420b, 422a, 422b. According to another example, a base station may configure a subframe that includes the self-contained subslot 620. According to another example, a base station may configure a subframe 702 with the subslot configuration 710. According to another example, a base station may configure a plurality of subframes 806a, 806b with a subframe configuration that includes a plurality of subslots 810a, 810b, 810c, 810d, 810e, 810f, 810g, and at least one subslot 810d may cross a subframe boundary 804.

At operation 924, the first base station may send information indicating the subslot configuration to at least a first neighboring base station. Based on the information indicating the subslot configuration, the first neighboring base station may configure x subframes with a subframe configuration that includes y subslots so that the subslot configuration used in a cell provided by the first neighboring base station is synchronized with the subslot configuration used in a cell provided by the first base station. The first neighboring base station may be a one-hop neighbor or first-ring neighbor with respect to the first base station, and this subslot configuration synchronization may mitigate interference, introduced by the first neighboring base station, to content (e.g., URLLC content) communicated by the first base station during one or more subslots of they subslots. In the context of FIG. 4, the first base station 402 may send information 480 indicating the subslot configuration.

At operation 926, the first base station may cause a second neighboring base station to reduce transmission power during at least one subslot of the y subslots. For example, the first base station may send information intended (e.g., addressed) for a second neighboring base station, and the information may indicate a request or instruction for the second neighboring base station to reduce a transmission power. In an aspect, the second neighboring base station may be at least a two-hop neighbor or second-ring neighbor with respect to the first base station. Because the second neighboring base station is at least a two-hop neighbor, the first neighboring base station may send the information indicating that the second neighboring base station is to reduce transmission power during at least one subslot of the y subslots, for example, based on the information indicating the subslot configuration that is sent by the first base station. Based on the information indicating that the second neighboring base station is to reduce transmission power, the second neighboring base station may reduce transmission power during at least one subslot of they subslots (e.g., during a subframe that occurs contemporaneously with the at least one subslot of the y subslots).

In the context of FIG. 4, the first base station 402 may cause the second neighboring base station 414 to reduce transmission power during at least one of the URLLC subslots 422a, 422b. The first base station 402 may cause the second neighboring base station 414 to reduce transmission power by sending the information 480 indicating the subslot configuration to the first neighboring base station 410. Based on the information 480 indicating the subslot configuration received from the first base station 402, the first neighboring base station 410 may send information 482 indicating that the second neighboring base station 414 is to reduce transmission power at least during at least one of the URLLC subslots 422a, 422b.

At operation 928, the first base station may puncture data or control information associated with eMBB content with content associated with URLLC. For example, the first base station may obtain a URLLC packet (e.g., from a higher layer of the first base station). According to one aspect, when a URLLC packet arrives (e.g., from a higher layer of the first base station), the first base station may puncture data or control information associated with eMBB with URLLC content included in the URLLC packet. For example, the first base station may remove one or more bits associated with eMBB and include one or more bits associated with URLLC content. In an aspect, the URLLC content from a URLLC packet may be carried in two symbols of a first portion of at least one subslot of the y subslots, and the first base station may puncture information associated with eMBB with URLLC content to be carried in the two symbols of the first portion of the at least one subslot of they subslots.

In the context of FIG. 4, the first base station may puncture data or control information associated with eMBB that would be carried in at least one of the two URLLC subslots 422a, 422b with URLLC content 484. In another example, a base station may puncture data or control information associated with eMBB that would be carried in the first portion 622 of the self-contained subslot 620 with URLLC content included in the URLLC packet 640.

At operation 930, the first base station may communicate content with a UE during at least one of they subslots. For example, the first base station may send the URLLC content punctured at the at least one subslot of they subslots. In the context of FIG. 4, the first base station 402 may communicate content 484 (e.g., data or control information) with the first UE 404 during at least one of the URLLC subslots 422a, 422b.

Figure 10:
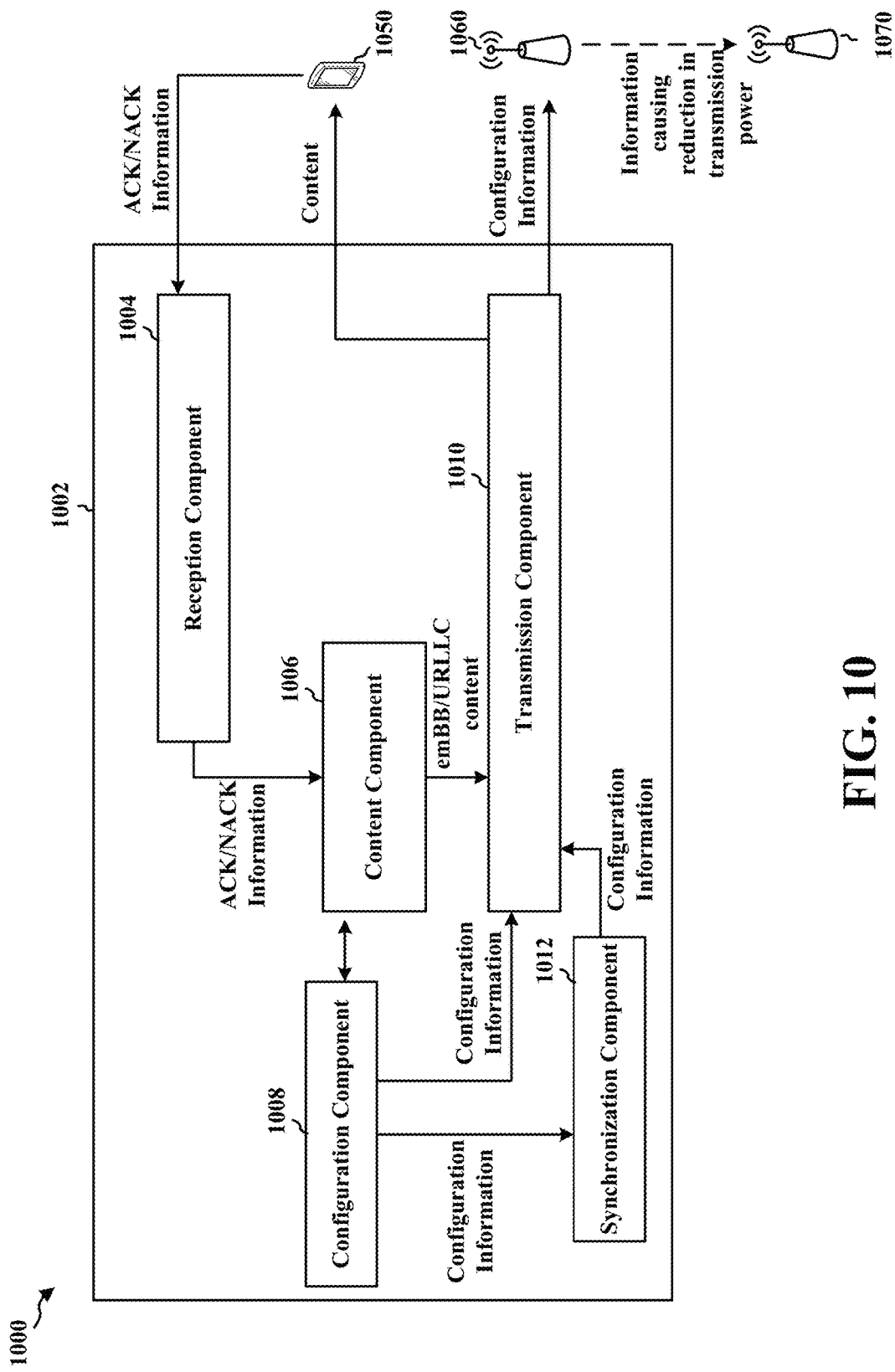
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus 1002 may be a base station. The various components and data flow are intended to be illustrative, and other components and data flow may be present.

The apparatus 1002 may include a reception component 1004 configured to receive signals (e.g., from a UE 1050 and/or from a neighboring base station 1060, 1070). The apparatus 1002 may include a transmission component 1010 configured to transmit signals (e.g., to the UE 1050 and/or to a neighboring base station 1060, 1070).

In aspects, the apparatus 1002 may include a configuration component 1008 that may configure x subframes with a subslot configuration that includes y subslots, and y may greater than x. The configuration component 1008 may configure each subslot of the y subslots to include a first portion having one or more symbols for carrying at least one of data or control information, a second portion having a gap, and a third portion for carrying ACK/NACK information associated with the first portion. The configuration component 1008 may configure each subslot such that the second portion may be between the first portion and the third portion. The configuration component 1008 may configure the second portion and the third portion to span at most one symbol. In an aspect, the configuration component 1008 may configure a number of symbols in the first portion of one or more subslots based at least in part on content to be communicated. In an aspect, the configuration component 1008 may configure a first subslot of they subslots to include a different number of the one or more symbols than the first portion of a second subslot of they subslots. In an aspect, the configuration component 1008 may configure they subslots such that at least one subslot of the y subslots crosses a subframe boundary.

The configuration component 1008 may provide this configuration information to a content component 1006, the transmission component 1010, and/or a synchronization component 1012.

The content component 1006 may be configured to determine content that is to be communicated with the UE 1050, such as URLLC content that is determined from a URLLC packet (e.g., a packet received from a higher layer) and/or eMBB content. The content may include data and/or control information. In one aspect, the content component 1006 may be configured to puncture data or control information associated with eMBB with content associated with URLLC. For example, the content component 1006 may puncture eMBB content with URLLC content in one or more subslots of they subslots. The content component 1006 may provide the content to the transmission component 1010. The transmission component 1010 may communicate content to the UE 1050 during at least one subslot of they subslots.

The synchronization component 1012 may be configured to determine information to be sent to one or more neighboring base station 1060, 1070, for example, to mitigate interference. The first neighboring base station 1060 may be a one-hop or first-ring neighbor with respect to the apparatus 1002, and the second neighboring base station 1070 may be a two-hop or second-ring neighbor with respect to the apparatus 1002.

In one aspect, the synchronization component 1012 may be configured to determine information indicating the subslot configuration based on information from the synchronization component 1012. The synchronization component 1012 may cause the transmission component 1010 to send, to the first neighboring base station 1060, information indicating the subslot configuration.

In one aspect, the synchronization component 1012 may be configured to cause the second neighboring base station 1070 to reduce transmission power during at least one subslot of they subslots. For example, the provision of the subslot configuration to the first neighboring base station 1060 may cause the first neighboring base station to send, to the second neighboring base station 1070, an indication that the second neighboring base station 1070 is to reduce transmission power during at least one subslot of they subslots.

The apparatus may include additional components that perform each of the blocks of the algorithm in the aforementioned flowcharts of FIGS. 9A-9B. As such, each block in the aforementioned flowcharts of FIGS. 9A-9B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
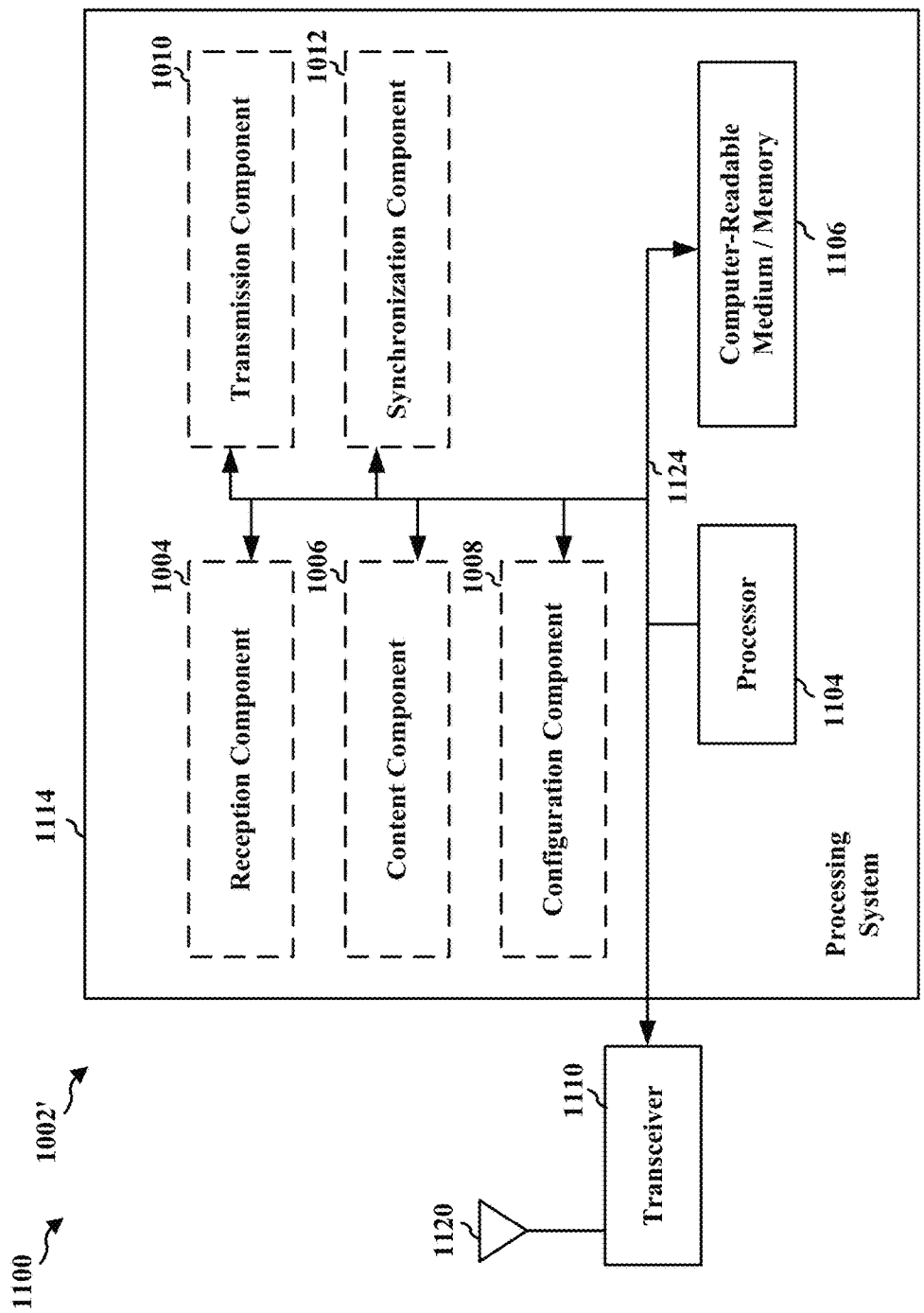
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' for wireless communication includes means for configuring x subframes with a subslot configuration that includes y subslots, and y may be greater than x. In an aspect, each subslot of the y subslots including a first portion having one or more symbols for carrying at least one of data or control information, a second portion having a gap, and a third portion for carrying ACK/NACK information associated with the first portion. In an aspect, the second portion may be between the first portion and the third portion. In an aspect, the second portion and the third portion may be at most one symbol. The apparatus 1002/1002' may further include means for sending information indicating the subslot configuration to at least one neighboring base station. The apparatus 1002/1002' may further include means for communicating content with a user equipment during at least one of the y subslots.

In an aspect, a number of the one or more symbols in the first portion for at least one subslot of the y subslots is based at least in part on the content to be communicated. In an aspect, the first portion of a first subslot of the y subslots includes a different number of the one or more symbols than the first portion of a second subslot of the y subslots. In an aspect, at least one subslot of the y subslots crosses a subframe boundary. In an aspect, the means for communicating the content further is configured to puncture data or control information associated with eMBB with the content, wherein the content is associated with URLLC.

In an aspect, the apparatus 1002/1002' further includes means for causing at least one other base station to reduce transmission power during at least one subslot of the y subslots, and the at least one other base station may be at least a two-hop neighbor of the base station.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
    configuring x subframes with a subslot configuration that includes y subslots, y being greater than x, each subslot of the y subslots including a first portion having one or more symbols for carrying at least one of data or control information, a second portion having a gap, and a third portion for carrying acknowledgment (ACK)/negative acknowledgment (NACK) information associated with the first portion, the second portion being between the first portion and the third portion, the second portion and the third portion comprising at most one symbol, wherein at least one subslot of the y subslots crosses a subframe boundary;
    sending information indicating the subslot configuration to at least one neighboring base station; and
    communicating content with a user equipment (UE) during at least one of the y subslots.

2. The method of claim 1, wherein a number of the one or more symbols in the first portion for at least one subslot of the y subslots is based at least in part on the content to be communicated.

3. The method of claim 1, wherein the first portion of a first subslot of the y subslots includes a different number of the one or more symbols than the first portion of a second subslot of the y subslots.

4. The method of claim 1, wherein the communicating the content further comprises:
    puncturing data or control information associated with enhanced mobile broadband (eMBB) with the content, wherein the content is associated with ultra-reliable low-latency communication (URLLC).

5. The method of claim 1, further comprising:
    causing at least one other base station to reduce transmission power during at least one subslot of the y subslots, wherein the at least one other base station is at least a two-hop neighbor of the base station.

6. A base station comprising:
    means for configuring x subframes with a subslot configuration that includes y subslots, y being greater than x, each subslot of the y subslots including a first portion having one or more symbols for carrying at least one of data or control information, a second portion having a gap, and a third portion for carrying acknowledgment (ACK)/negative acknowledgment (NACK) information associated with the first portion, the second portion being between the first portion and the third portion, the second portion and the third portion comprising at most one symbol, wherein at least one subslot of the y subslots crosses a subframe boundary;
    means for sending information indicating the subslot configuration to at least one neighboring base station; and
    means for communicating content with a user equipment during at least one of the y sub slots.

7. The base station of claim 6, wherein a number of the one or more symbols in the first portion for at least one subslot of the y subslots is based at least in part on the content to be communicated.

8. The base station of claim 6, wherein the first portion of a first subslot of the y subslots includes a different number of the one or more symbols than the first portion of a second subslot of the y subslots.

9. The base station of claim 6, wherein the means for communicating the content further is configured to puncture data or control information associated with enhanced mobile broadband (eMBB) with the content, wherein the content is associated with ultra-reliable low-latency communication (URLLC).

10. The base station of claim 6, further comprising:
    means for causing at least one other base station to reduce transmission power during at least one subslot of the y subslots, wherein the at least one other base station is at least a two-hop neighbor of the base station.

11. A base station comprising:
    a memory; and
    at least one processor coupled to the memory and configured to:
        configure x subframes with a subslot configuration that includes y subslots, y being greater than x, each subslot of the y subslots including a first portion having one or more symbols for carrying at least one of data or control information, a second portion having a gap, and a third portion for carrying acknowledgment (ACK)/negative acknowledgment (NACK) information associated with the first portion, the second portion being between the first portion and the third portion, the second portion and the third portion comprising at most one symbol, wherein at least one subslot of the y subslots crosses a subframe boundary;
send information indicating the subslot configuration to at least one neighboring base station; and
communicate content with a user equipment (UE) during at least one of the y subslots.

12. The base station of claim 11, wherein a number of the one or more symbols in the first portion for at least one subslot of the y subslots is based at least in part on the content to be communicated.

13. The base station of claim 11, wherein the first portion of a first subslot of the y subslots includes a different number of the one or more symbols than the first portion of a second subslot of the y subslots.

14. The base station of claim 11, wherein the at least one processor is configured to communicate the content based on puncturing data or control information associated with enhanced mobile broadband (eMBB) with the content, wherein the content is associated with ultra-reliable low-latency communication (URLLC).

15. The base station of claim 11, wherein the at least one processor is further configured to:
cause at least one other base station to reduce transmission power during at least one subslot of the y subslots, wherein the at least one other base station is at least a two-hop neighbor of the base station.

16. A non-transitory computer-readable medium storing computer executable code for wireless communication by a base station, comprising code to:
configure x subframes with a subslot configuration that includes y subslots, y being greater than x, each subslot of the y subslots including a first portion having one or more symbols for carrying at least one of data or control information, a second portion having a gap, and a third portion for carrying acknowledgment (ACK)/negative acknowledgment (NACK) information associated with the first portion, the second portion being between the first portion and the third portion, the second portion and the third portion comprising at most one symbol, wherein at least one subslot of the y subslots crosses a subframe boundary;
send information indicating the subslot configuration to at least one neighboring base station; and
communicate content with a user equipment during at least one of the y subslots.

17. The non-transitory computer-readable medium of claim 16, wherein a number of the one or more symbols in the first portion for at least one subslot of the y subslots is based at least in part on the content to be communicated.

18. The non-transitory computer-readable medium of claim 16, wherein the first portion of a first subslot of the y subslots includes a different number of the one or more symbols than the first portion of a second subslot of they subslots.

19. The non-transitory computer-readable medium of claim 16, wherein the communicating the content further comprises:
puncturing data or control information associated with enhanced mobile broadband (eMBB) with the content, wherein the content is associated with ultra-reliable low-latency communication (URLLC).

20. The non-transitory computer-readable medium of claim 16, further comprising:
causing at least one other base station to reduce transmission power during at least one subslot of the y subslots, wherein the at least one other base station is at least a two-hop neighbor of the base station.

* * * * *